(12) United States Patent
Tisch et al.

(10) Patent No.: US 9,807,501 B1
(45) Date of Patent: Oct. 31, 2017

(54) GENERATING AN AUDIO SIGNAL FROM MULTIPLE MICROPHONES BASED ON A WET MICROPHONE CONDITION

(71) Applicant: GoPro, Inc., San Mateo, CA (US)

(72) Inventors: Erich Tisch, San Francisco, CA (US); Joyce Rosenbaum, Mountain View, CA (US); Magnus Hansson, Los Altos, CA (US); Ke Li, San Jose, CA (US); David Wurtz, Santa Clara, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/396,379

(22) Filed: Dec. 30, 2016

Related U.S. Application Data

(60) Provisional application No. 62/396,002, filed on Sep. 16, 2016.

(51) Int. Cl.
| | |
|---|---|
| *H01R 3/00* | (2006.01) |
| *H04R 3/00* | (2006.01) |
| *H04R 1/08* | (2006.01) |
| *H04R 5/027* | (2006.01) |
| *H04R 29/00* | (2006.01) |
| *G06F 3/044* | (2006.01) |
| *G06K 9/46* | (2006.01) |

(52) U.S. Cl.
CPC ............ *H04R 3/005* (2013.01); *H04R 1/083* (2013.01); *H04R 5/027* (2013.01); *H04R 29/005* (2013.01); *G06F 3/044* (2013.01); *G06K 9/4671* (2013.01); *H04R 2430/21* (2013.01)

(58) Field of Classification Search
CPC ...... H04R 3/005; H04R 5/027; H04R 29/005; H04R 2430/21; H04R 1/083; G06F 3/044; G06K 9/4671

USPC ........................................................ 381/92
See application file for complete search history.

(56) References Cited

U.S. PATENT DOCUMENTS

| | | | |
|---|---|---|---|
| 5,508,766 | A | 4/1996 | Boyd et al. |
| 6,292,213 | B1 | 9/2001 | Jones |
| 6,318,826 | B1 | 11/2001 | Froger et al. |
| 6,349,824 | B1 | 2/2002 | Yamada |
| 7,023,338 | B1 | 4/2006 | Foth |
| 8,963,875 | B2 | 2/2015 | Sugiura et al. |
| 9,251,687 | B2 | 2/2016 | Thompson et al. |
| 9,301,412 | B2 | 3/2016 | Micko et al. |
| 9,386,364 | B2 | 7/2016 | Aihara |

(Continued)

OTHER PUBLICATIONS

PCT International Search Report and Written Opinion for PCT/US2016/039679, Dec. 12, 2016, 18 Pages.

(Continued)

*Primary Examiner* — Paul S Kim
(74) *Attorney, Agent, or Firm* — Fenwick & West LLP

(57) ABSTRACT

An audio capture device selects between multiple microphones to generate an output audio signal depending on detected conditions. When the presence of wind noise or other uncorrelated noise is detected, the audio capture device selects, for each of a plurality of different frequency sub-bands, an audio signal having the lowest noise and combines the selected frequency sub-bands signals to generate an output audio signal. When wind noise or other uncorrelated noise is not detected, the audio capture device determines whether each of a plurality of microphones are wet or dry and selects one or more audio signals from the microphones depending on their respective conditions.

20 Claims, 6 Drawing Sheets

(56) References Cited

U.S. PATENT DOCUMENTS

| | | |
|---|---|---|
| 2005/0114128 A1 | 5/2005 | Hetherington et al. |
| 2007/0110416 A1 | 5/2007 | Yamaguchi et al. |
| 2007/0115387 A1 | 5/2007 | Ho |
| 2009/0052715 A1 | 2/2009 | Zhang et al. |
| 2009/0213557 A1 | 8/2009 | Wen |
| 2010/0207785 A1 | 8/2010 | Suganuma et al. |
| 2010/0225461 A1 | 9/2010 | Tuli |
| 2011/0147245 A1 | 6/2011 | Yim |
| 2012/0123772 A1 | 5/2012 | Thyssen et al. |
| 2012/0188690 A1 | 7/2012 | Aihara |
| 2012/0249470 A1 | 10/2012 | Sugiura et al. |
| 2012/0250270 A1 | 10/2012 | Liu |
| 2012/0275620 A1 | 11/2012 | Matsuo |
| 2013/0282369 A1 | 10/2013 | Visser et al. |
| 2014/0185853 A1* | 7/2014 | Aihara ............... H04R 1/086 381/334 |
| 2014/0198932 A1 | 7/2014 | Parkins |
| 2014/0313044 A1 | 10/2014 | Thompson et al. |
| 2015/0326748 A1 | 11/2015 | Tisch et al. |
| 2015/0345699 A1 | 12/2015 | Manniche et al. |
| 2015/0351266 A1 | 12/2015 | Micko et al. |
| 2016/0080861 A1 | 3/2016 | Helm et al. |
| 2016/0146935 A1 | 5/2016 | Lee et al. |
| 2016/0241945 A1 | 8/2016 | Zadesky et al. |
| 2016/0277818 A1 | 9/2016 | Jones et al. |
| 2016/0301998 A1 | 10/2016 | Abe et al. |

OTHER PUBLICATIONS

PCT Invitation to Pay Additional Fees and, Where Applicable, Protest Fee, for PCT/US2016/039679, Oct. 13, 2016, 7 Pages.

\* cited by examiner

GENERATING AN AUDIO SIGNAL FROM MULTIPLE MICROPHONES BASED ON A WET MICROPHONE CONDITION

RELATED APPLICATIONS

This application claims the benefit of U.S. Provisional Application No. 62/396,002 filed on Sep. 16, 2016, the content of which is incorporated by reference herein.

BACKGROUND

Technical Field

This disclosure relates to audio capture, and more specifically, to generating an audio signal from multiple available microphones in an audio capture system.

Description of the Related Art

Varying environmental conditions may significantly impact the quality of audio captured by a conventional camera. For example, the audio may be affected by wind, water, or other environmental conditions. Optimizing the audio capture is particularly challenging when the conditions are subject to frequent changing, such as when the camera is moved in and out of the presence of wind, when the camera is moved in and out of water, or when the camera is subject to splashing water. During certain activities such as surfing, swimming, or other water sports, such transitions may occur frequently over an extended period of time.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
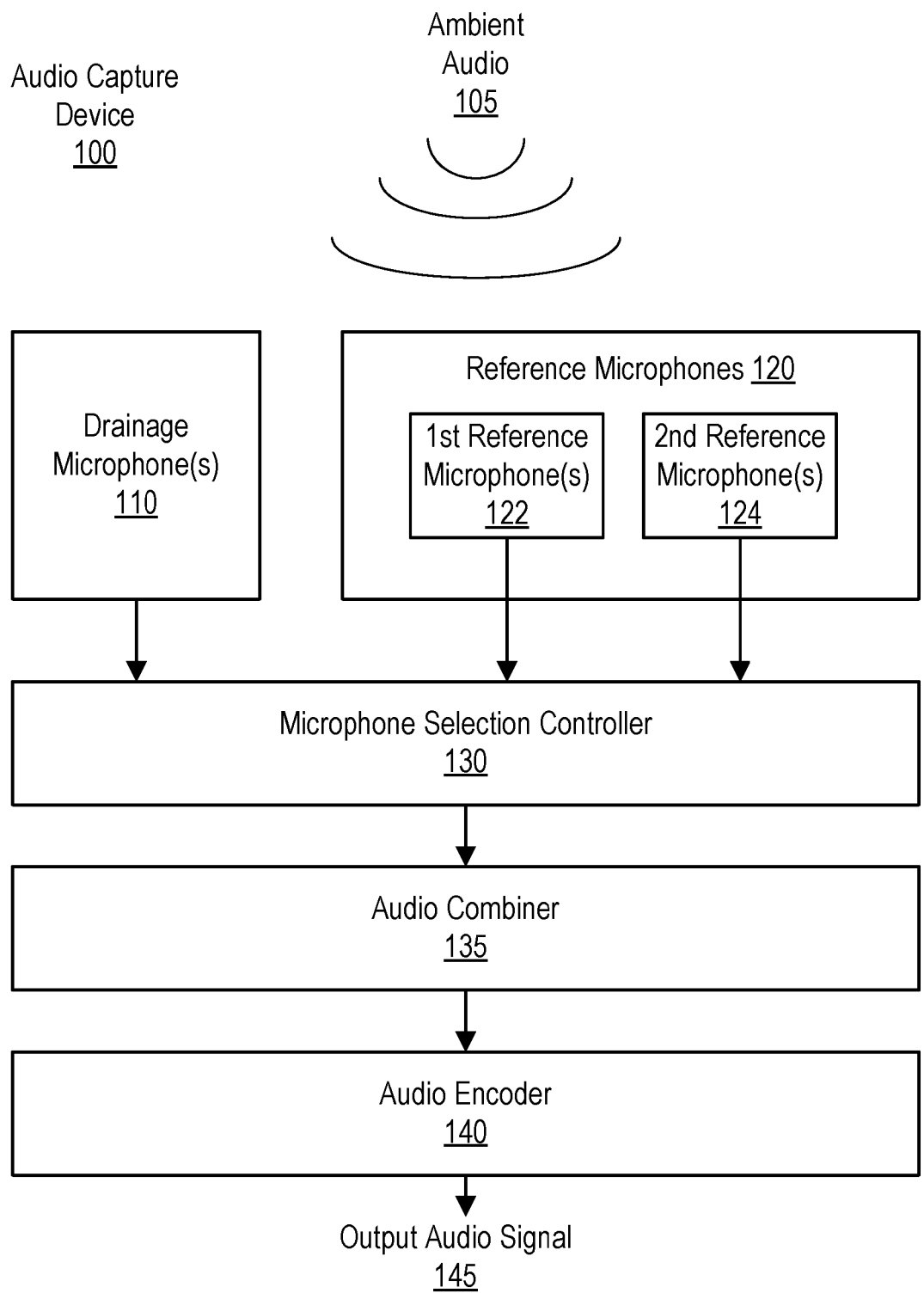
FIG. 1 is a block diagram illustrating an example embodiment of an audio capture device.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In a first embodiment, an output audio signal is generated in an audio capture system having a plurality of microphones. At least a first audio signal and a second audio signal are received from the plurality of microphones. A first plurality of frequency sub-band signals are generated from the first audio signal corresponding to a plurality of frequency sub-bands and a second plurality of frequency sub-band signals are generated from the second audio signal corresponding to the plurality of frequency sub-bands. For each of the first and second pluralities of frequency sub-band signals, a frequency band-dependent offset is applied to generate a first plurality of offset frequency sub-band signals from the first plurality of frequency sub-band signals and a second plurality of offset frequency sub-band signals from the second plurality of frequency sub-band signals. An overall correlation metric is determined between the first plurality of offset frequency sub-band signals and the second plurality of offset frequency sub-band signals. Responsive to the overall correlation metric exceeding a first predefined threshold, the audio signals are processed according to a correlated audio signal processing algorithm to generate an output audio signal. Responsive to the overall correlation metric not exceeding the first predefined threshold, the audio signals are processed according to an uncorrelated audio signal processing algorithm to generate the output audio signal.

In another embodiment, an output audio signal is generated in an audio capture device having multiple microphones including at least a first reference microphone capturing a first audio signal, a second reference microphone capturing a second audio signal, and a drainage microphone capturing a third audio signal. The drainage microphone is adjacent to a drainage channel for draining liquid away from the drainage microphone. The audio capture device determines if each of the first reference microphone and the second microphone are wet or dry. Responsive to determining that both the first reference microphone and the second reference microphone are wet, the third audio signal is selected from the drainage microphone, and a first mono audio output signal corresponding to the first time period is generated from the third audio signal. Responsive to determining that both the first reference microphone and the second reference microphone are dry, the first audio signal from the first reference microphone and the second audio signal from the second reference microphone are selected, and a stereo audio output signal corresponding to the second time period is generated by processing the first and second audio signals. Responsive to determining that the first reference microphone is dry and the second reference microphone is wet, the first audio signal from the first reference microphone is selected, and a second mono audio output signal corresponding to the third time period is generated from the first audio signal. Responsive to determining that the second reference microphone is dry and the first reference microphone is wet, the second audio signal from the second reference microphone is selected, and a third mono output audio signal corresponding to the fourth time period is generated from the second audio signal.

Example Audio Capture Device

FIG. 1 illustrates an example of an audio capture device 100 including multiple microphones. The audio capture system 100 may include a plurality of reference microphone 120 including at least a first reference microphone 122 (or set of first reference microphones 122) and a second reference microphone 124 (or set of second reference microphones 124), at least one drainage microphone 110, a microphone selection controller 130, an audio combiner 135, and an audio encoder 140. In an embodiment, the first reference microphone 122 may be positioned on a top face of the audio capture device 100 (and may also be referred to as a "top microphone" herein), the second reference microphone 124 may be positioned on a side face of the audio capture device 100 (and may be referred to as a "side microphone" herein), and the drainage microphone 110 may be positioned on a front face of the audio capture device 100 (and may also be referred to as a "front microphone" herein).

The drainage microphone 110 may have a drainage channel adjacent to it to enable water to drain away from the drainage microphone 110 more quickly than water may drain from the reference microphones 120 that lack the drainage channel. The drainage channel may be structured such that water is drawn away from the drainage microphone 110 due to gravitational, capillary, and/or surface tension forces. In various embodiments, the drainage channel may be implemented using an inner surface energy coating or particular hole dimensions, shapes, density, patterns, or interior curvature or a combination of features that affect that drainage profile of the drainage microphone 110. The drainage microphone 110 can therefore recover relatively quickly when moved from being submerged under water to being out of water. Thus, compared to the reference microphones 120, the drainage microphone 110 may better mitigate frequency response distortion caused by water being trapped on the membrane over the drainage microphone 110 or obscuring the acoustic pathways to the drainage microphone 110. In an embodiment, at least the reference microphones 120 may include a physical barrier between the splashing water and a waterproof membrane over the microphone to mitigate the impulses from splashing water. For example, in one embodiment, the barrier comprises a plastic barrier that absorbs some of the water impact impulse. In another embodiment, an air buffer may exist between the barrier and the waterproof membrane over the reference microphones 120. In another embodiment, a porting structure traps a buffer layer of water on the outside of a waterproof membrane over the reference microphone 120, thus creating a protective layer that blocks splashing water from directly impacting the waterproof membrane. Additionally, the muffling quality of water pooled on the waterproof membrane reduces some high frequency content of the splashing water. In one embodiment, the drainage microphone 110 may similarly include a waterproof membrane.

In operation, both the drainage microphone 110 and the reference microphones 120 capture ambient audio 105 and pass the captured audio to the microphone selection controller 130. The audio captured by the drainage microphone 110, the first reference microphones 122, and the second reference microphone 124 may each have varying audio characteristics due to the different structural features and/or positions of the microphones 110, 122, 124 on the audio capture device 100. For example, the drainage microphone 110 may have degraded signal-to-noise in windy conditions relative to the reference microphones 120 due to the drainage channel. Furthermore, the drainage microphone 110 may have degraded signal-to-noise when the audio capture device 100 is submerged under water so that water cannot drain from the drainage channel. However, the drainage microphone 110 may generally have better signal-to-noise ratio performance than the reference microphones 120 when the audio capture device 100 is moved out of water or is subject to splashing because it can more quickly drain the water away from the microphone. Furthermore, due to their different placement, the first reference microphone 122 or second reference microphone 124 may provide better signal quality in particular frequency bands at different times during capture. Therefore, a different selection between the audio signals or portions thereof (e.g., different frequency sub-bands) captured by drainage microphone 110, the first reference microphone 122, and the second reference microphone 124 may be desirable under different audio capture conditions.

The microphone selection controller 130 processes the audio captured from the drainage microphone 110 and the reference microphones 120 and selects, based on the audio characteristics, which of the audio signals or portions thereof (e.g., particular frequency sub-bands) to pass to the audio combiner 135. In one embodiment, the microphone selection controller 130 operates on a block-by-block basis. In this embodiment, for each time interval, the microphone selection controller 130 receives a first block of audio data from the drainage microphone 110, a second block of audio data from the first reference microphone 122, and third block of audio data from the second reference microphone 124. Each block corresponds to ambient audio 105 captured by the respective microphones 110, 122, 124 during the same time interval. The microphone selection controller 130 processes the set of blocks to determine which block or blocks or portions thereof to pass to the audio combiner 135. The microphone selection controller 130 may pass more than one block from different ones of the microphones 110, 122, 124 to the audio combiner 135 in a given time interval. If multiple blocks are passed to the audio combiner 135, the audio combiner 135 may either combine the blocks to generate a block of a single audio channel or may generate blocks of separate stereo audio channels.

In one embodiment, the microphone selection controller 130 may divide the audio in each block into a plurality of different frequency sub-bands. The microphone selection controller 130 may then determine which frequency sub-bands from which blocks to pass to the audio combiner 135. Thus, for example, for a given time interval, the microphone selection controller 130 does not necessarily pass or hold an entire block from a given microphone 110, 122, 124, but may instead pass only certain frequency sub-bands from the different blocks from the different microphones 110, 122, 124. In this way, the microphone selection controller 130 may choose frequency sub-bands from particular microphones that will enable the audio combiner 135 to provide the best quality audio output.

In one embodiment, the microphone selection controller 130 generally operates to select the drainage microphone 110 directly after transitioning out of water when the reference microphones 122, 124 are both wet since the drainage microphone 110 tends to drain the water faster and has better audio quality when the microphones are wet. Furthermore, the microphone selection controller 130 generally operates to select one or both of the reference microphones 120 when the microphones 122, 124 are dry.

The audio combiner 135 combines the blocks or portions thereof (e.g., particular frequency sub-bands) of audio received from the microphone selection controller 130 to generate a combined audio signal. This combining may include combining blocks or portions thereof (e.g., particular frequency sub-bands) received from the different microphones 110, 122, 124.

An audio encoder 140 then encodes the combined audio signal to generate an output audio signal 145. Encoding may include compressing the audio signal.

In an embodiment, the microphone selection control 130, the audio combiner 135, and/or the audio encoder 140 are implemented as a processor and a non-transitory computer-readable storage medium storing instructions that when executed by the processor carry out the functions attributed to the microphone selection controller 130, the audio combiner 135, and/or audio encoder 140 described herein. The microphone selection controller 130, audio combiner 135, and audio encoder 140 may be implemented using a common processor or separate processors. In other embodiments, the microphone selection controller 130, audio combiner 135, and/or audio encoder 140 may be implemented in hardware, (e.g., with an FPGA or ASIC), firmware, or a combination of hardware, firmware and software.

In an embodiment, the audio capture system 100 is implemented within a camera system such as the camera 600 described below with respect to FIG. 6. Such a camera may use the encoded audio 145 captured by the audio capture system 100 as an audio channel for video captured by the camera. Thus, the audio capture system 100 may capture audio in a manner that is concurrent and synchronized with corresponding frames of video.

Figure 2:
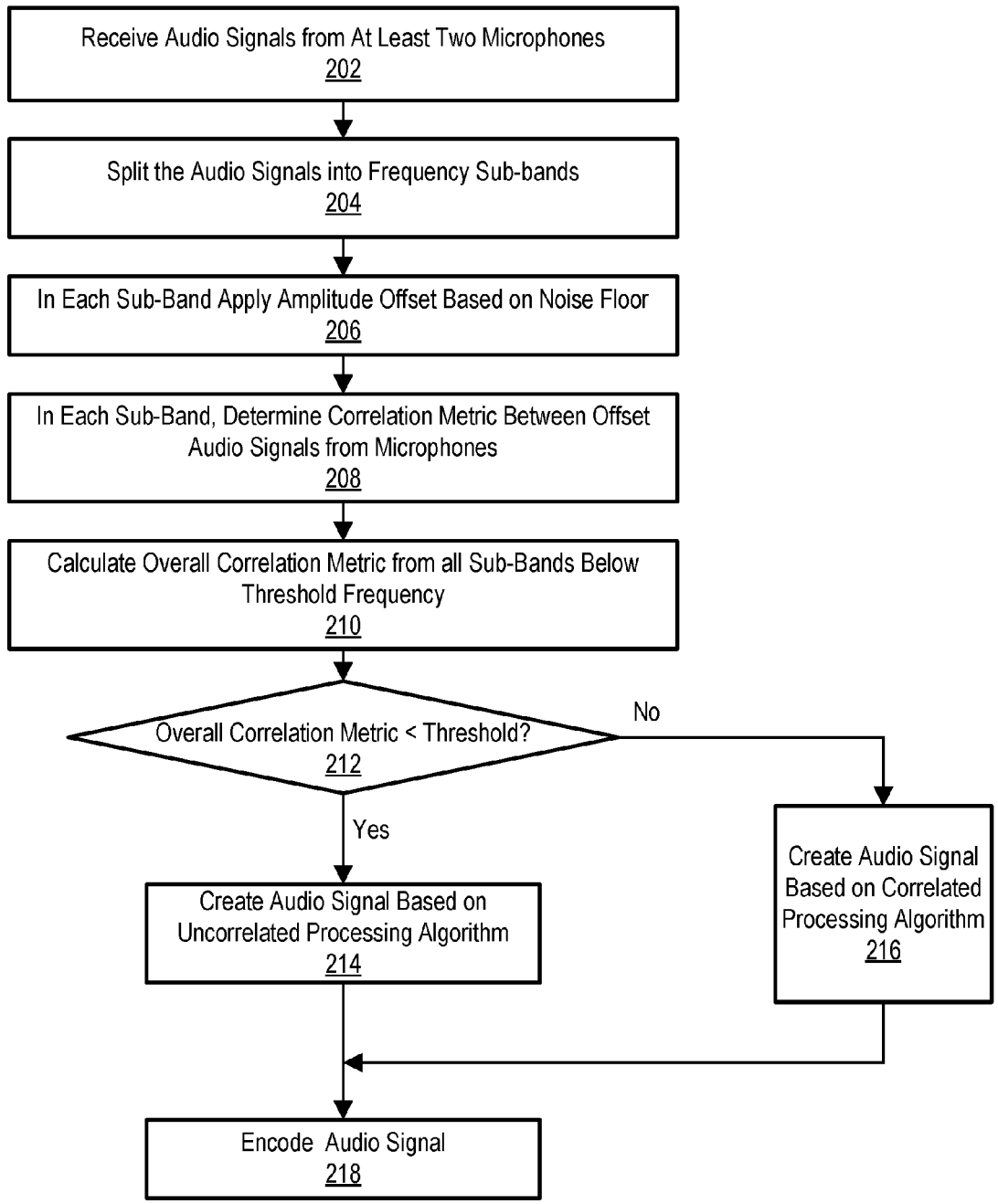
FIG. 2 is a flowchart illustrating an embodiment of a process for generating an audio signal from multiple microphones dependent on detected environmental conditions.

FIG. 2 is a flowchart illustrating an embodiment of a process for generating an audio output audio signal from audio signals captured from multiple different microphones. Audio signals are received 202 from at least two microphones, which may include the drainage microphone 110, the first reference microphone 122, the second reference microphone 124 or any combination thereof. The audio signals may comprise audio blocks for a particular time interval of a longer audio stream. The audio signals 204 are each split in a plurality of different frequency sub-bands. In each frequency sub-band, a noise-floor dependent amplitude offset is applied 206. The noise floor represents, for each sub-band, a threshold amplitude level of a minimum amount of noise expected to be present in the audio signal. The respective noise floors for different sub-bands may be different. A greater amplitude offset is applied in sub-bands with higher noise floors to ensure that the signals can be reliably correlated in the following steps. In each sub-band, a sub-band correlation metric is determined 208 between the offset audio signals from the two or more microphones. The sub-band correlation metric may represent a similarity between signal levels of audio block sub-bands captured by the microphones for a given time interval. Generally, the signals will be well-correlated in the absence of wind noise or other noise having similar noise profiles in the given sub-band, but will be poorly correlated when wind or other noise is present in the sub-band. Thus, the correlation metric may operate as a wind detection metric. In one embodiment, each sub-band correlation metric comprises a value from 0 to 1 where a correlation metric of 1 represents a situation consistent with little to no uncorrelated noise present in the sub-band, and a correlation metric of 0 means that the captured audio may be substantially comprised of uncorrelated noise such as wind noise.

An overall correlation metric is calculated 210 for all sub-bands below a frequency threshold (e.g., below 1500 Hz). The overall correlation metric may comprise for example, an average (e.g., mean) or weighted average of the sub-band correlation metrics for sub-bands under the frequency threshold. The overall correlation metric is compared 212 to a predefined threshold. In one embodiment, the predefined threshold may dynamically change between two or more predefined thresholds depending on the previous state (e.g., whether the threshold was exceeded in the previous audio block) to include a hysteresis effect. For example, if for the previously processed block, the correlation metric exceeded the predefined threshold (e.g., a predefined threshold of 0.8), then the predefined threshold is set lower for the current block (e.g. 0.7). If for the previously processed block, the correlation metric did not exceed the predefined threshold (e.g., a predefined threshold of 0.8), then the predefined threshold for the current block is set higher (e.g., to 0.8).

If the correlation metric exceeds the predefined threshold in step 212, a correlated audio signal processing algorithm is applied 216 to generate an output audio signal based on one or more of the drainage microphone 110, the first reference microphone 120, and the second reference microphone 130, or a combination thereof. For example, in one embodiment, the correlated audio signal processing algorithm generates a combined audio signal based on water conditions associated with each of the microphones (e.g., whether each microphone is wet or dry). An example embodiment of the correlated audio signal processing algorithm is described in further detail below with respect to FIG. 4. Otherwise, if the overall correlation metric is below the threshold in step 212, the microphone selection controller 130 creates 214 a combined audio signal based on an uncorrelated audio signal processing algorithm. The uncorrelated processing algorithm may select, for each frequency band, a frequency component of an audio signal having the lowest uncorrelated noise and combine these frequency components together to create the combined audio signal. An example embodiment of an uncorrelated audio signal processing algorithm is described in further detail below with respect to FIG. 3. The combined audio signal is then encoded 218.

Figure 3:
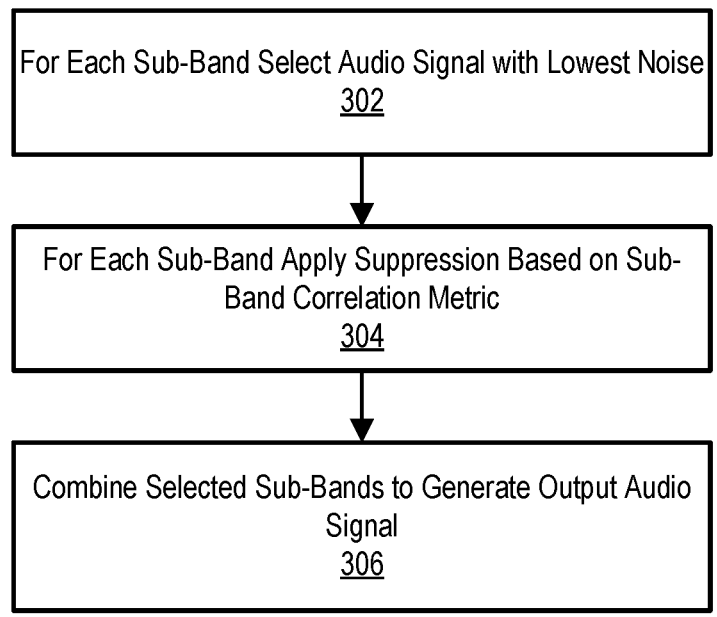
FIG. 3 is a flowchart illustrating an embodiment of a process for generating an audio signal in conditions resulting in substantially uncorrelated audio signals from different microphones.

FIG. 3 is a flowchart illustrating an embodiment of an uncorrelated audio signal processing algorithm. This algorithm may be applied, for example, when wind noise or other uncorrelated noise is detected in the audio signals. For each sub-band, the audio signal having the lowest wind noise is selected 302 for that time interval. For example, in one embodiment, the audio signal having the lowest root-mean-square signal level in a given frequency sub-band is selected as the audio signal with the lowest wind noise for that frequency sub-band. In each sub-band, noise suppression processing is then applied 304 on the selected audio signal based on the sub-band correlation metric for that sub-band to further reduce the noise. The original (non-offset) audio signals for each of the selected sub-bands with noise suppression processing applied are then combined 306 to generate the output audio signal.

Figure 4:
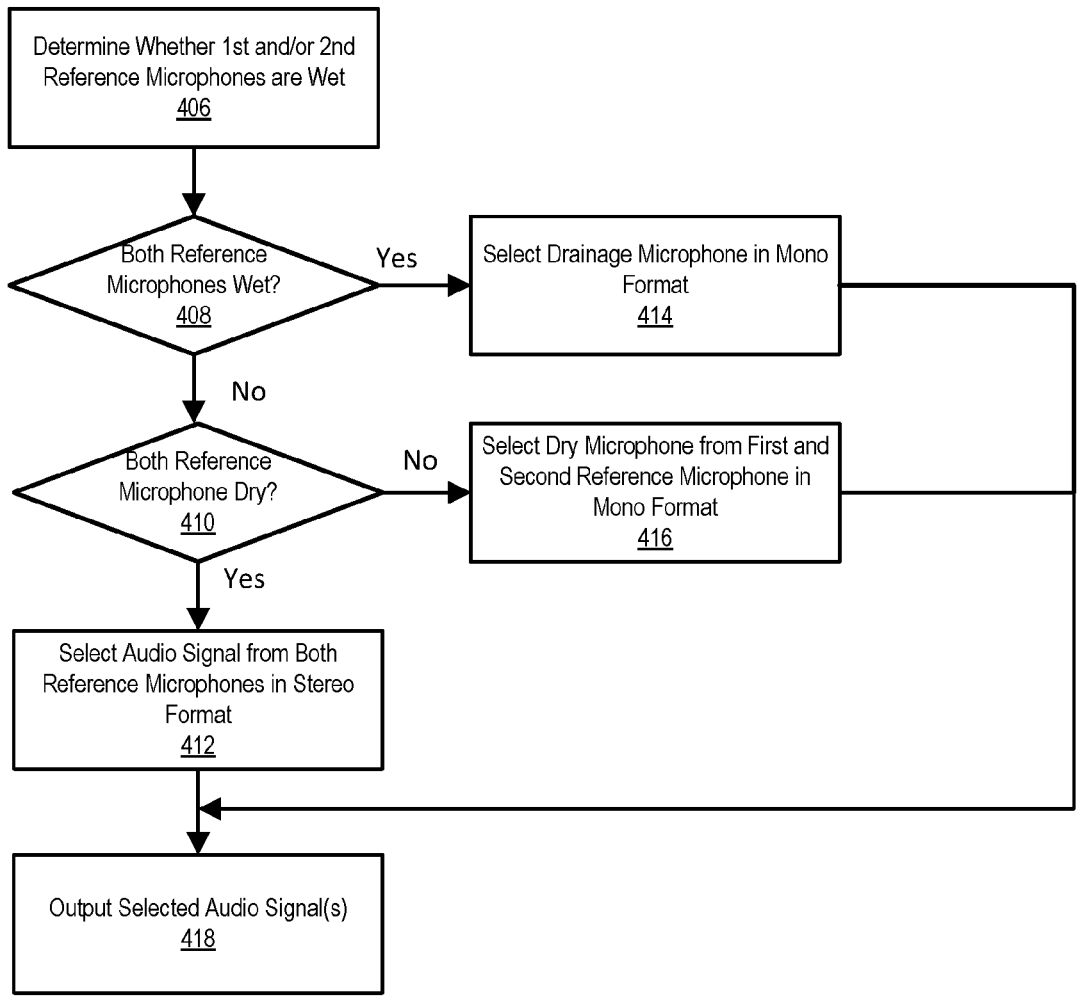
FIG. 4 is a flowchart illustrating an embodiment of a process for selecting microphones in the camera and encoding the audio dependent on whether the microphones are wet or dry.

FIG. 4 is a flowchart illustrating an embodiment of a process for selecting between one or more of a drainage microphone 110, a first reference microphone 122, and a second reference microphone 124 based on a water condition. This process may correspond to step 216 in FIG. 2 and thus may be performed when correlated signals are detected between the different microphones. The microphone selection controller 130 determines 406 whether either or both of the reference microphones 122, 124 are wet. In one embodiment, the wet microphone condition can be detected by observing spectral response changes over a predefined frequency range (e.g., 2 kHz-4 kHz) or by detecting the sound pattern known to be associated with a wet microphone as compared to a dry microphone. For example, in one embodiment the spectral features associated with a wet microphone can be found through empirical means. In general, when a microphone membrane is wet, higher frequency sounds are attenuated because the extra weight of the water on the membrane reduces the vibration of the membrane. Thus, the water generally acts as a low pass filter. An example of a process for detecting wet microphones is described in U.S. patent application Ser. No. 15/083,266 filed on Mar. 28, 2016, which is incorporated by reference herein. In one embodiment, spectral changes can be monitored based on the measured known drain time constant differences between the microphone geometries. In other embodiments, a sensor near the microphone membrane may be used to detect the wet microphone condition. If the microphone selection controller 130 determines 408 that both reference microphones 122, 124 are wet, then the audio signal from the drainage microphone 110 is selected 414 and outputted 418 as a mono output audio channel. Otherwise, if the microphone selection controller 130 determines 410 that both reference microphones are dry, the microphone section controller 130 selects 412 the audio signals from both the reference microphones 122,124 and processes them to output 418 channels of a stereo output audio signal. For example, a beamforming process may be applied to generate the stereo output audio signal from the two audio signal. Otherwise, if neither both reference microphones 122, 124 are wet nor both microphones 122, 124 are dry (e.g., the first reference microphone 122 is wet and the second reference microphone 124 is dry or vice versa), the microphone selection controller 130 selects 416 the dry microphone from among the first and second reference microphones 122, 124 for outputting 418 in as a mono output audio channel.

Table 1 illustrates the results of applying the process of FIG. 4:

TABLE 1

| 1st Ref. Mic Wet? | 2nd Ref. Mic Wet? | Drainage Mic Wet? | Encoding | Mic Selection |
|---|---|---|---|---|
| No | No | No | Stereo | 1st and 2nd Ref. Mics |
| No | No | Yes | Stereo | 1st and 2nd Ref. Mics |
| No | Yes | No | Mono | 1st Ref. Mic |
| No | Yes | Yes | Mono | 1st Ref. Mic |
| Yes | No | No | Mono | 2nd Ref. Mic |
| Yes | No | Yes | Mono | 2nd Ref. Mic |
| Yes | Yes | No | Mono | Drainage Mic |
| Yes | Yes | Yes | Mono | Drainage Mic |

As illustrated in the table, both reference microphones 120 are selected in a stereo encoding when they are both dry. If only one of the reference microphones 120 is dry, the dry one is selected in a mono encoding. If both the reference microphones are wet, the drainage microphone is selected.

Figure 5:
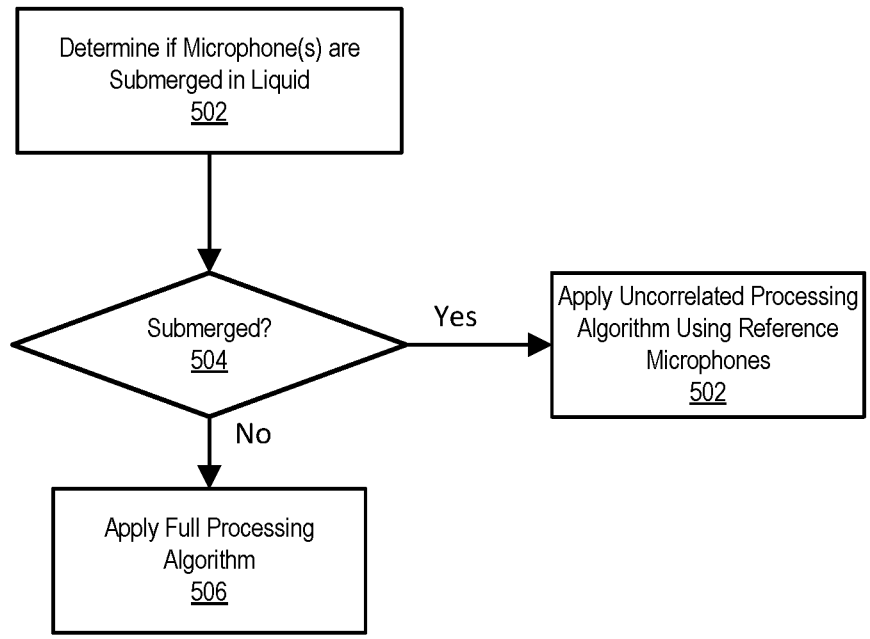
FIG. 5 is a flowchart illustrating an embodiment of a process for generating an audio signal from multiple microphones depending on a submersion condition.

In general, under the process of FIGS. 2-4 described above, an audio capture device 100 that is completely submerged in liquid will generate audio signals having uncorrelated noise similar to wind noise and will thus be processed according to the uncorrelated audio signal processing algorithm of FIG. 4. In an alternative embodiment, an independent submersion detection sensor may be used to determine whether the audio capture device 100 is submerged. For example, in the process of FIG. 5, the microphone selection controller 130 determines 502 if the microphones 110, 122, 124 are submerged in liquid (e.g., water). In one embodiment, a water submersion sensor may be used to determine if the microphones 110, 122, 124 are submerged. In other embodiment (in which the audio capture device 100 is integrated with a camera), an image analysis may be performed to detect features representative of the camera being submerged in water. For example, detecting color loss may be indicative of the camera being submerged because it causes exponential loss of light intensity depending on wavelength. Furthermore, crinkle patterns may be present in the image when the camera is submerged because the water surface can form small concave and convex lenses that create patches of light and dark. Additionally, light reflecting off particles in the water creates scatter and diffusion that can be detected to determine if the camera is submerged. In another embodiment, a touch screen on the camera may be used to detect a change in capacitance when the camera is submerged indicative of submersion. In yet another embodiment, water pressure on a waterproof membrane of one of the reference microphones 122, 124 may be detected because the waterproof membrane will deflect under external water pressure. This causes increased tension which shifts the waterproof membrane's resonance higher from its nominal value and can be detected in the microphone signal. Furthermore, the deflection of the waterproof membrane will results in a positive pressure on and deflection of the microphone membrane which could manifest itself as a shift in microphone bias. Additionally, a sensor could be placed near the waterproof membrane to detect an increase in shear force caused by deflection of the waterproof membrane that is indicative of the microphone being submerged.

If the microphones are detected 504 to be submerged, the drainage microphone 110 is not used and an output audio signal is derived from one or more of the reference microphones 122, 124 because the drainage microphone 110 generally performs poorly underwater. For example, in one embodiment, an uncorrelated audio signal processing algorithm similar to FIG. 3 is applied to process the audio signals from the reference microphones on a sub-band basis, and for each sub-band, select the reference audio signal having the lowest noise. Alternatively, if the audio capture device 100 is determined 504 not to be submerged, an audio signal processing algorithm similar to FIG. 2 may be applied 506 to determine whether or not the signals are correlated and apply the correlated or uncorrelated audio signal processing depending on the determination.

Example Camera Configuration

Figure 6:
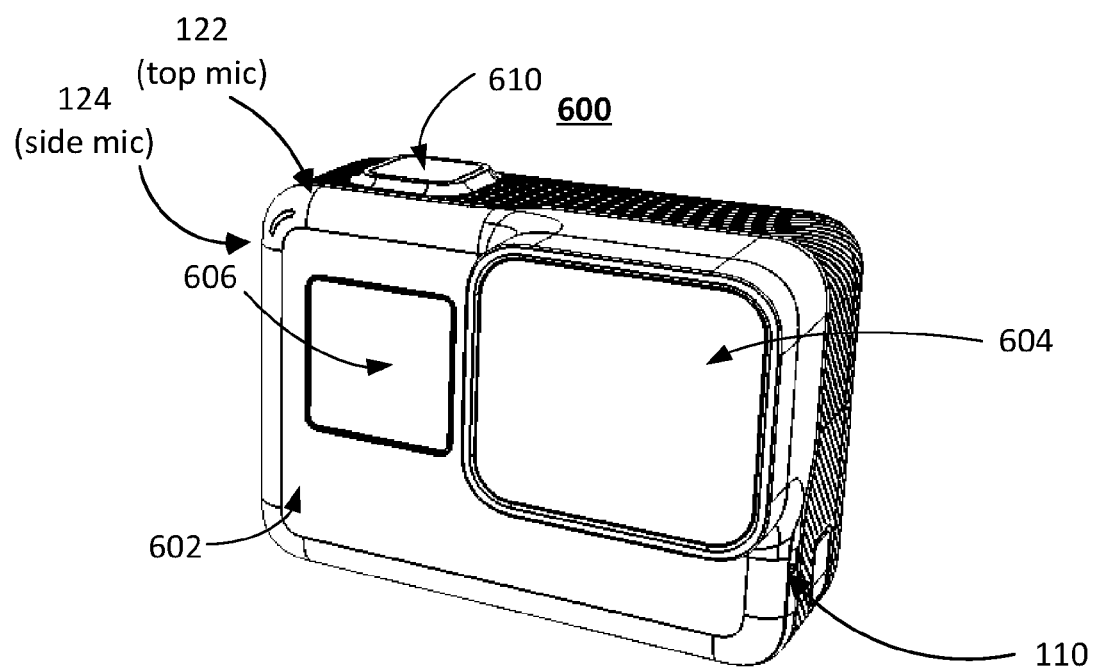
FIG. 6 is an example embodiment of a camera in which the audio capture device may be integrated.

FIG. 6 illustrate an embodiment of an example camera 600 that may include the audio capture device 100. The camera 600 may comprise a camera body 602 having a camera lens 604 structured on a front surface of the camera body, various indicators on the front of the surface of the camera body 602 (such as LEDs, displays, and the like), various input mechanisms (such as buttons, switches, and touch-screen mechanisms), and electronics (e.g., imaging electronics, power electronics, etc.) internal to the camera body 602 for capturing images via the camera lens and/or performing other functions. The camera 600 may be configured to capture images and video, and to store captured images and video for subsequent display or playback.

The camera 600 can include various indicators, including a display panel 606. The camera 600 can also include buttons 610 configured to allow a user of the camera to interact with the camera, to turn the camera on, and to otherwise configure the operating mode of the camera. The camera 600 can also include a plurality of microphones including the drainage microphone 110 (located near a bottom right corner of the camera 600), and reference microphones 122, 124 (located on a top and side face respectively of the camera 600 near the top left corner) described above. The front, bottom, or side surfaces of the camera may include one or more drainage ports as part of a drainage channel adjacent to the drainage microphone 110 for the camera audio system as described above. For example, the drainage channel includes an opening on a bottom face of the camera to drain liquid away from a recess in which the drainage microphone 110 is positioned.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a drainage path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for generating an output audio signal in an audio capture device having multiple microphones including at least a first reference microphone capturing a first audio signal, a second reference microphone capturing a second audio signal, and a drainage microphone capturing a third audio signal, the drainage microphone adjacent to a drainage channel for draining liquid away from the drainage microphone, the method comprising:
   during a first time period, determining that both the first reference microphone and the second reference microphone are wet, selecting the third audio signal from the drainage microphone, and generating a first mono audio output signal corresponding to the first time period from the third audio signal;
   during a second time period, determining that both the first reference microphone and the second reference microphone are dry, selecting the first audio signal from the first reference microphone and selecting the second audio signal from the second reference microphone, generating a stereo audio output signal corresponding to the second time period by processing the first and second audio signals;
   during a third time period, determining that the first reference microphone is dry and the second reference microphone is wet, selecting the first audio signal from the first reference microphone, and generating a second mono audio output signal corresponding to the third time period from the first audio signal; and
   during a fourth time period, determining that the second reference microphone is dry and the first reference microphone is wet, selecting the second audio signal from the second reference microphone, and generating a third mono output audio signal corresponding to the fourth time period from the second audio signal.

2. The method of claim 1, further comprising:
   during a fifth time period, determining that the audio capture device is submerged in liquid;
   selecting the first audio signal from the first reference microphone and the second audio signal from the second reference microphone; and
   generating a fourth mono audio output signal corresponding to the fifth time period from the first audio signal and the second audio signal.

3. The method of claim 2, wherein determining that the audio capture device is submerged in liquid comprises:
   performing an image analysis to detect visual features representative of the audio capture device being submerged.

4. The method of claim 2, wherein determining that the audio capture device is submerged in liquid comprises:
   detecting, via a touch screen integrated with the audio capture device, a change in capacitance indicative of the audio capture device being submerged.

5. The method of claim 1, wherein determining that the both the first microphone and the second microphone are wet comprises:
   detecting that a spectral response change over a predefined frequency range meets a predefined criteria.

6. The method of claim 1, wherein determining that the both the first microphone and the second microphone are wet comprises:
   detecting a sound pattern indicative of a wet microphone condition.

7. The method of claim 1, wherein generating a stereo audio output signal comprises applying a beamforming process to the first and second audio signals.

8. A non-transitory computer readable storage medium storing instructions for generating an output audio signal in an audio capture device having multiple microphones including at least a first reference microphone capturing a first audio signal, a second reference microphone capturing a second audio signal, and a drainage microphone capturing a third audio signal, the drainage microphone adjacent to a drainage channel for draining liquid away from the drainage microphone, the instructions when executed by a processor cause the processor to perform steps including:
   determining if each of the first reference microphone and the second microphone are wet or dry;
   responsive to determining that both the first reference microphone and the second reference microphone are wet, selecting the third audio signal from the drainage microphone, and generating a first mono audio output signal corresponding to the first time period from the third audio signal;

responsive to determining that both the first reference microphone and the second reference microphone are dry, selecting the first audio signal from the first reference microphone and selecting the second audio signal from the second reference microphone, generating a stereo audio output signal corresponding to the second time period by processing the first and second audio signals;

responsive to determining that the first reference microphone is dry and the second reference microphone is wet, selecting the first audio signal from the first reference microphone, and generating a second mono audio output signal corresponding to the third time period from the first audio signal; and responsive to determining that the second reference microphone is dry and the first reference microphone is wet, selecting the second audio signal from the second reference microphone, and generating a third mono output audio signal corresponding to the fourth time period from the second audio signal.

9. The non-transitory computer readable storage medium of claim 8, the instructions when executed further causing the processor to perform steps including:

determining if the audio capture device is submerged in liquid;

responsive to determining that the audio capture device is submerged in liquid, selecting the first audio signal from the first reference microphone and the second audio signal from the second reference microphone, and generating a fourth mono audio output signal corresponding to the fifth time period from the first audio signal and the second audio signal.

10. The non-transitory computer readable storage medium of claim 9, wherein determining that the audio capture device is submerged in liquid comprises:

performing an image analysis to detect visual features representative of the audio capture device being submerged.

11. The non-transitory computer readable storage medium of claim 9, wherein determining that the audio capture device is submerged in liquid comprises:

detecting, via a touch screen integrated with the audio capture device, a change in capacitance indicative of the audio capture device being submerged.

12. The non-transitory computer readable storage medium of claim 8, wherein determining that the both the first microphone and the second microphone are wet comprises:

detecting that a spectral response change over a predefined frequency range meets a predefined criteria.

13. The non-transitory computer readable storage medium of claim 8, wherein determining that the both the first microphone and the second microphone are wet comprises:

detecting a sound pattern indicative of a wet microphone condition.

14. The non-transitory computer readable storage medium of claim 8, wherein generating a stereo audio output signal comprises applying a beamforming process to the first and second audio signals.

15. An audio capture device comprising:

a first reference microphone capturing a first audio signal;
a second reference microphone capturing a second audio signal;
a drainage microphone capturing a third audio signal;

a drainage channel adjacent to the drainage microphone for draining liquid away from the drainage microphone;
a processor; and
a non-transitory computer readable storage medium storing instructions for generating an output audio signal in an audio capture device having multiple microphones the instructions when executed by a processor cause the processor to perform steps including:

determining if each of the first reference microphone and the second microphone are wet or dry;

responsive to determining that both the first reference microphone and the second reference microphone are wet, selecting the third audio signal from the drainage microphone, and generating a first mono audio output signal corresponding to the first time period from the third audio signal;

responsive to determining that both the first reference microphone and the second reference microphone are dry, selecting the first audio signal from the first reference microphone and selecting the second audio signal from the second reference microphone, generating a stereo audio output signal corresponding to the second time period by processing the first and second audio signals;

responsive to determining that the first reference microphone is dry and the second reference microphone is wet, selecting the first audio signal from the first reference microphone, and generating a second mono audio output signal corresponding to the third time period from the first audio signal; and responsive to determining that the second reference microphone is dry and the first reference microphone is wet, selecting the second audio signal from the second reference microphone, and generating a third mono output audio signal corresponding to the fourth time period from the second audio signal.

16. The audio capture device of claim 15, wherein the instructions when executed further causing the processor to perform steps including:

determining if the audio capture device is submerged in liquid;

responsive to determining that the audio capture device is submerged in liquid, selecting the first audio signal from the first reference microphone and the second audio signal from the second reference microphone, and generating a fourth mono audio output signal corresponding to the fifth time period from the first audio signal and the second audio signal.

17. The audio capture device of claim 16, wherein determining that the audio capture device is submerged in liquid comprises:

performing an image analysis to detect visual features representative of the audio capture device being submerged.

18. The audio capture device of claim 16, wherein determining that the audio capture device is submerged in liquid comprises:

detecting, via a touch screen integrated with the audio capture device, a change in capacitance indicative of the audio capture device being submerged.

19. The audio capture device of claim 15, wherein determining that the both the first microphone and the second microphone are wet comprises:

detecting that a spectral response change over a predefined frequency range meets a predefined criteria.

20. The audio capture device of claim 15, wherein generating a stereo audio output signal comprises applying a beamforming process to the first and second audio signals.

\* \* \* \* \*